United States Patent
Wickramathilaka et al.

(10) Patent No.: US 10,597,579 B2
(45) Date of Patent: Mar. 24, 2020

(54) ANTI-RETENTION AGENT IN STEAM-SOLVENT OIL RECOVERY

(71) Applicant: CONOCOPHILLIPS COMPANY, Houston, TX (US)

(72) Inventors: Siluni Wickramathilaka, Houston, TX (US); Logan Warren, Houston, TX (US); Thomas J. Wheeler, Houston, TX (US); David A. Brown, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 512 days.

(21) Appl. No.: 14/594,456

(22) Filed: Jan. 12, 2015

(65) Prior Publication Data

US 2015/0198027 A1     Jul. 16, 2015

Related U.S. Application Data

(60) Provisional application No. 61/926,632, filed on Jan. 13, 2014.

(51) Int. Cl.
*C09K 8/594* (2006.01)
*E21B 43/24* (2006.01)
*C09K 8/592* (2006.01)

(52) U.S. Cl.
CPC .............. *C09K 8/594* (2013.01); *C09K 8/592* (2013.01); *E21B 43/2406* (2013.01)

(58) Field of Classification Search
CPC ...... C09K 8/591; C09K 8/592; E21B 43/2406
USPC .................................................... 166/272.4
See application file for complete search history.

(56) References Cited

U.S. PATENT DOCUMENTS

| | | | |
|---|---|---|---|
| 5,834,406 A * | 11/1998 | Sydansk | C09K 8/512 507/202 |
| 6,230,814 B1 | 5/2001 | Nasr et al. | |
| 6,591,908 B2 * | 7/2003 | Nasr | C09K 8/592 166/263 |
| 7,055,602 B2 * | 6/2006 | Shpakoff | C09K 8/584 166/268 |
| 8,256,511 B2 * | 9/2012 | Boone | C09K 8/58 166/266 |
| 8,261,832 B2 * | 9/2012 | Ryan | E21B 43/2401 166/272.1 |
| 2014/0144627 A1 | 5/2014 | Salazar Hernandez et al. | |
| 2014/0216739 A1 | 8/2014 | Brown et al. | |
| 2014/0345855 A1 | 11/2014 | Wilfing et al. | |
| 2014/0345861 A1 | 11/2014 | Stalder et al. | |

OTHER PUBLICATIONS

Nasr, T. N., et al.: 2003, Novel expanding solvent-SAGD process "ES-SAGD", Journal of Canadian Petroleum Technology 42(1), 13-16.

Nasr, T. N. et al.: 2006, New hybrid steam-solvent processes for the recovery of heavy oil and bitumen, paper SPE 101717 presented at the SPE Abu Dhabi International Petroleum Exhibition and Conference, Abu Dhabi. Nov. 5-8.

Gates, Ian D., Solvent-aided Steam-Assisted Gravity Drainage in thin oil sand reservoirs, J. Petrol. Sci. Engin. 74(3-4):138-146 (2010).

Ashrafi M., et al., Numerical Simulation Study of Field Scale SAGD and ES-SAGD Processes Investigating the Effect of Relative Permeabilities, Energy and Environment Research 3(1): 93-105 (2013).

* cited by examiner

*Primary Examiner* — Angela M DiTrani Leff
*Assistant Examiner* — Ashish K Varma
(74) *Attorney, Agent, or Firm* — Boulware & Valoir (57) ABSTRACT

The present invention relates to a method for reducing solvent retention in ES-SAGD process so as to increase process economics wherein an anti-retention agent is injected into the reservoir to decrease solvent retention in the reservoir. The anti-retention agent can be made pre-injection or can form in situ, and comprises an agent in which the solvent is readily soluble, such that the solvent partitions into the foam, colloidal dispersion, or gel, and out of the condensed water or steam, and away from the reservoir rock.

19 Claims, 3 Drawing Sheets

ANTI-RETENTION AGENT IN STEAM-SOLVENT OIL RECOVERY

RELATED APPLICATIONS

This application is a non-provisional application which claims benefit under 35 USC § 119(e) to U.S. Provisional Application Ser. No. 61/926,632 filed Jan. 13, 2014, entitled "ANTI-RETENTION AGENT IN STEAM-SOLVENT OIL RECOVERY," which is incorporated herein in its entirety.

FIELD OF THE DISCLOSURE

The disclosure generally relates to a method of recovering hydrocarbons in a subterranean reservoir using Expanding Solvent-Steam Assisted Gravity Drainage (ES-SAGD) or Solvent Assisted Process (SAP) or any other process where a solvent is co-injected along with steam, and more particularly to the inclusion of anti-retention agent to reduce the solvent retention in the reservoir.

BACKGROUND OF THE DISCLOSURE

Many countries in the world have large deposits of oil sands, including the United States, but the world's largest deposits occur in Canada and Venezuela. Oil sands are a type of unconventional petroleum deposit, containing naturally occurring mixtures of sand, clay, water, and a dense and extremely viscous form of petroleum technically referred to as "bitumen," but which can also be called heavy oil or tar.

Bitumen is a thick, sticky form of crude oil, so heavy and thick that it will not flow unless heated or diluted with lighter hydrocarbons. Often times, viscosity can be in excess of 1,000,000 cP. At room temperature, it is much like cold molasses.

Due to their high viscosity, these heavy oils are hard to mobilize, and they generally must be made to flow with heat and/or solvent before one can produce and transport them. One common way to heat bitumen is by injecting steam into the reservoir. Steam Assisted Gravity Drainage (SAGD) is the most extensively used technique for in situ recovery of bitumen resources in the McMurray Formation in the Alberta Oil Sands. In a typical SAGD process, shown in FIG. 1, two horizontal wells are vertically spaced by 4 to less than 10 meters (m). The production well is located near the bottom of the pay and the steam injection well is located directly above and parallel to the production well. In SAGD, steam is injected continuously into the injection well, where it rises in the reservoir and forms a steam chamber.

Figure 1:
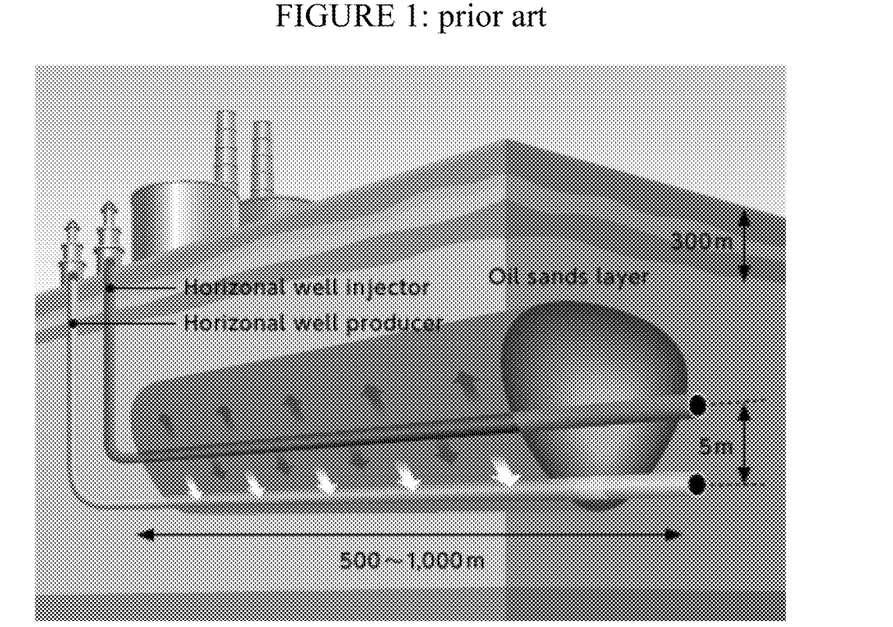
FIG. 1 shows a conventional SAGD well pair.

With continuous steam injection, the steam chamber will continue to grow upward and laterally into the surrounding formation. At the interface between the steam chamber and cold oil, steam condenses and heat is transferred to the surrounding oil. This heated oil becomes mobile and drains, together with the condensed water from the steam, into the production well due to gravity drainage within the steam chamber.

Figure 2:
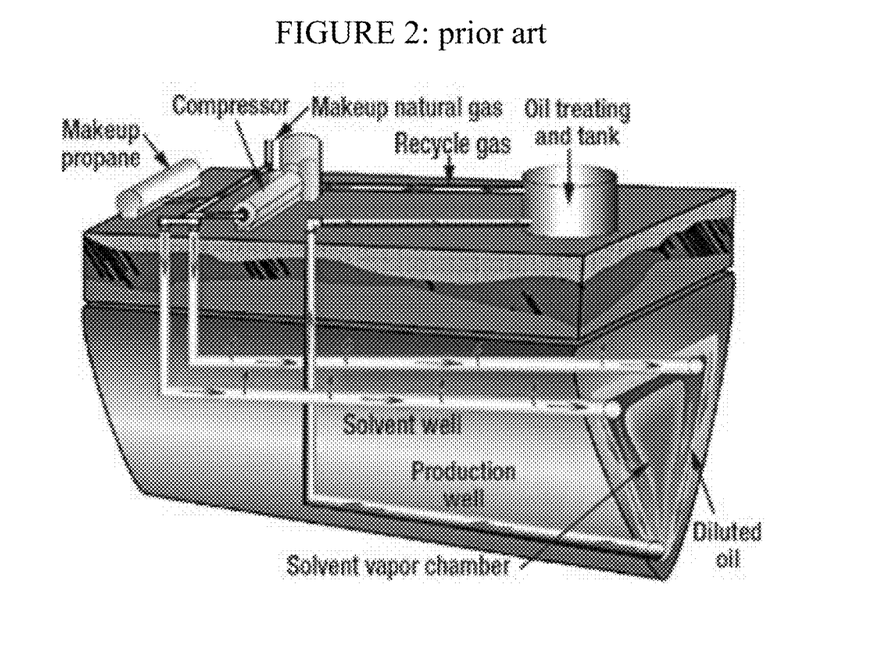
FIG. 2 shows a typical VAPEX process.

Vapor Extraction (VAPEX) is a relatively new process that can also be used to extract oil from heavy oil reservoirs. It is similar to SAGD, but instead of injecting hot steam into the oil reservoir, hydrocarbon solvents are used (see FIG. 2). The solvent gas is injected at its dew point, and the carrier gas is intended to raise the dew point of the solvent vapor so that it remains in the vapor phase at the reservoir pressure. A vapor chamber is formed and it propagates laterally. The main mechanism is improvement in mobility through viscosity reduction, but the process relies on molecular diffusion and mechanical dispersion for the transfer of solvent to the bitumen for viscosity reduction. Dispersion and diffusion are inherently slow, and therefore, are much less efficient than transfer of heat for viscosity reduction. However, the process uses much less heat and water than SAGD, and thus has some benefits.

Another developing enhanced oil recovery technique combines aspects of both SAGD and VAPEX. In expanding solvent-SAGD or ES-SAGD, also known as solvent assisted processes (SAP) or solvent co-injection (SCI), both steam and solvent are co-injected into the well. During the ES-SAGD process a small amount of solvent is co-injected with steam in a vapor phase. The solvent phase will have similar phase change properties as that of the steam. Suitable solvents are propane, butane, pentane, hexane, heptane, octane, naphtha, diluent and other light hydrocarbons and alkanes. Typically the injected solvent comprises 5-25 percent of the injected steam.

Figure 3:
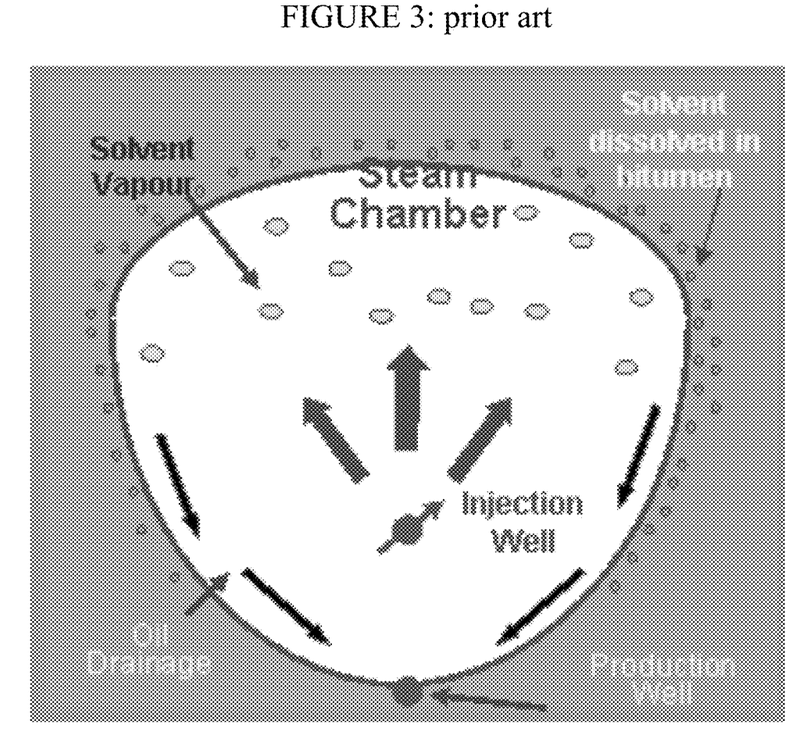
FIG. 3 shows an ES-SAGD process that can be used in the invention.

The solvent condenses with steam at the boundary of the steam chamber, diluting the oil and reduces its viscosity in conjunction with heat from the condensed steam. This process offers higher oil production rates and recovery with less energy and water consumption than those for the SAGD process, and less solvent usage than VAPEX. Experiments conducted with two-dimensional models for Cold Lake-type live oil showed improved oil recovery and rate, enhanced non-condensable gas production, lower residual oil saturation, and faster lateral advancement of heated zones (Nasr and Ayodele, 2006). A solvent assisted SAGD is shown in FIG. 3 and is described in U.S. Pat. Nos. 6,230,814; 6,591,908.

Figure 4:
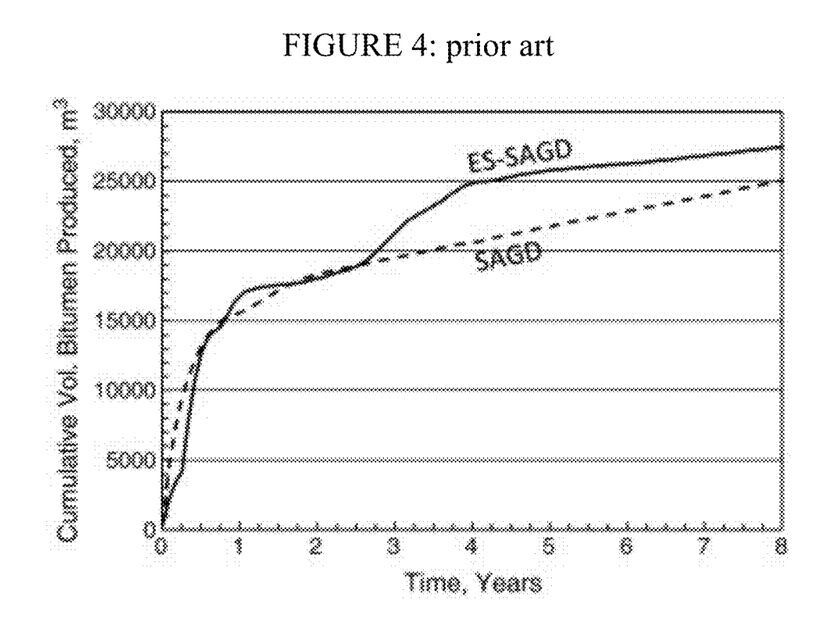
FIG. 4 shows cumulative bitumen production for SAGD versus ES-SAGD (from Gates 2010).
Figure 5:
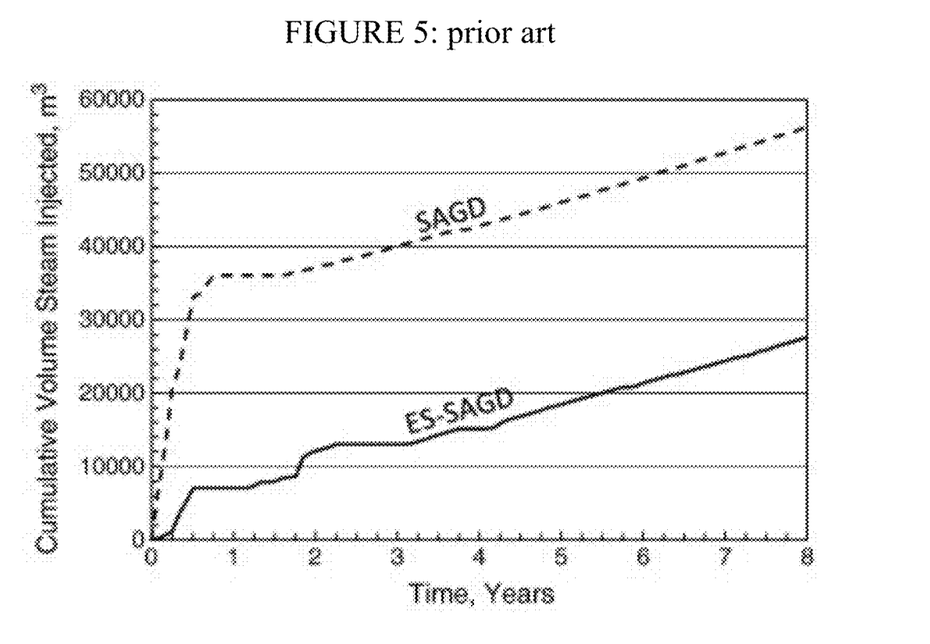
FIG. 5 shows cumulative steam production for SAGD versus ES-SAGD (from Gates 2010).

Combining solvent dilution and heat reduces oil viscosity much more effectively than using heat alone, uses less water and produces fewer overall greenhouse gas emissions. See FIG. 4 and FIG. 5.

Because of the high cost of the injected solvents, they are typically recovered from the reservoir and recycled or used as a diluent replacement for pipeline viscosity specifications. However, if too little solvent is recovered, the process can be uneconomic because the solvent is often more expensive than the produced heavy oil. The economics of a steam-solvent injection process thus depends on the enhancement of oil recovery as well as solvent recovery. The lower the solvent retention in the reservoir, the better the economics of the process.

As thermal-solvent recovery technologies continue to be developed, it is still unclear how to reduce solvent retention in the reservoir so that solvent costs can be minimized. Therefore, there is a need to find the optimal strategy to reduce solvent retention in the reservoir in ES-SAGD and similar processes, and thus improve the economics of oil production. This disclosure addresses one or more of those needs.

SUMMARY OF THE DISCLOSURE

The ES-SAGD process is an improvement of the SAGD process that has been recently applied in the field, but solvent retention in the reservoir considerably impacts process economics. A new methodology is developed herein to reduce the solvent retention in the reservoir. Reducing solvent retention in the reservoir is critical to process economics since the solvent used is often more expensive than the oil produced.

Generally speaking, the invention employs the use of an anti-retention agent, such as a foam, colloidal dispersion or gel to improve solvent recovery. The anti-retention agent can be made pre-injection or can form in situ, and comprises an agent in which the solvent is readily soluble, such that the solvent partitions into the foam, colloidal dispersion, or gel, and out of the condensed water or steam, and away from the reservoir rock. When the foam, colloidal dispersion or gel collapses, the agent and solvent are produced along with the remaining production fluid, which contains mostly mobilized oil and water. Both the agent and the solvent can be recovered and reused.

In one embodiment, an anti-retention agent comprising a foam, colloidal dispersion or gel can be injected after an ES-SAGD operation to recover some of the solvents retained within the steam chamber.

In another variation, an anti-retention agent along with low quality steam can be injected after implementing an ES-SAGD process to recover more solvents, and the low quality steam could further extend the steam chamber by creating in-situ steam through utilizing the heat that was left behind within the steam chamber during the ES-SAGD process as outlined in a previous disclosure (US-2014-0216739).

In yet another variation, thief zones can be identified and filled with an anti-retention agent, thus preventing or minimizing solvent loss to thief zones. An anti-retention agent could be injected through a new vertical or horizontal well or an existing delineation well (a certain type of appraisal well, usually one drilled specifically to determine the boundary of a discovered reservoir) drilled in the top/bottom thief zones to minimize solvent losses to thief zones (No. 61/914, 507, filed 11 Dec. 2013).

Another application of injecting an anti-retention agent would be to accelerate solvent condensation at an appropriate time during the operation. The injected foam/colloidal dispersion would reduce the temperature within the steam chamber and thereby, accelerate the solvent condensation.

The foam/colloidal dispersion injection can precede ES-SAGD where the foam/colloidal dispersion can be used to block thief zones. The injection can also follow ES-SAGD or be used alternatingly therewith. Further, the ES-SAGD methods can also be combined with other enhanced oil recovery techniques.

By either combining these methodologies and/or choosing the appropriate method for each field case, oil recovery is improved while lowering steam to oil ratio ("SOR") or cumulative SOR ("CSOR") and overall costs of the operation.

The selected anti-retention agent may have one or more of the following qualities:
  Higher affinity to the solvents than water and reservoir rock/sand.
  Reduce the surface/interfacial tension between the rock and the solvent.
  Be able to solubilize solvent.
  Should be stable in the presence of solvent.
  Be thermally and chemically stable at high temperatures.
  Have low density and low viscosity (0.000598-0.0770 g/cm$^3$ and 0.0123-0.0216 cP) (only for foams injected from a bottom injector).
  Be able to withstand the salinity/divalent cations in the particular formation brine.
  Have low adsorption onto rock/clay surfaces.
  Be nonreactive with the particular reservoir minerals.
  Be effective at the particular reservoir brine pH.
  Be of low cost.

In one embodiment, the heated co-injection fluid can comprise at least 15% liquid volume of solvent, preferably 20%, and more preferably up to 25%, with the majority of the remainder being steam.

In one embodiment, the solvent comprises at least 60% liquid volume of C5+ hydrocarbons, preferably at least 80%, 85%, 90%, or 95% or more.

In one embodiment of the invention, the heated fluid composition may be injected into an injection well by first mixing the steam and solvent, prior to injection. In another embodiment, separate lines for steam and solvent can be used to independently, but concurrently, introduce steam and solvent into the injection well, where the steam and solvent will mix. A separate solvent injection is particularly suitable for retrofitting existing well-pad equipment. Also, it may be easier to monitor the solvent flow rate when separate steam and solvent lines are used to co-inject the heated fluid composition.

In a typical SAGD process, initial thermal communication between an injection well and a producing well is established by injection of steam and/or low viscosity hydrocarbon solvent into one of the wells until thermal communication is achieved, as indicated by oil production, but other methods can be used, including $CO_2$ flood, in situ combustion, EM heating methods, and the like. In the alternative, a combination of these methods may be employed.

In reservoirs where communication between an injection well and a producing well is already established, the ES-SAGD process can be implemented by injecting the specified steam-solvent mixture into the injection well followed by, preceded by, or alternating with anti-retention agent injections to aid in solvent recovery.

Anti-retention agent injections can be via injection or production wells, or both, but it may be preferred to use higher injection wells, thus taking advantage of gravity drainage. Alternatively, foam/colloidal dispersion injections can be into existing or specially drilled delineation wells directly into thief zones or near play boundaries.

In a preferred embodiment, the injection and producing wells are vertically stacked horizontal wells, spaced about 5 meters vertically apart, near the bottom of the formation, but this is not a requirement. Novel well configurations can also be used, such as the fish-bone wells and radial pad wells, recently described in patent applications by ConocoPhillips. In these variations, the wells are not vertically paired as in traditional SAGD, but nonetheless the wells are positioned to allow gravity drainage and they can be considered SAGD variants. See US-2014-0345855 and US-2014-0345861.

The invention includes one or more of the following embodiments, in any combination thereof:

A method of producing hydrocarbons from a subterranean formation comprising rock and hydrocarbon that has at least one injection well and at least one producing well that can each communicate with at least a portion of said formation, and said injection well being in fluid communication with said production well, the method comprising: co-injecting steam and solvent into said injection well; injecting an anti-retention agent comprising a foam or a colloidal dispersion into said injection well, said anti-retention agent having higher affinity for said solvent than does water or said rock; producing production fluids comprising hydrocarbon, water and solvent from said production well; recovering solvent from said production fluids, wherein more solvent is recovered than would be recovered without said anti-retention agent injection step.

A method of producing hydrocarbons from a subterranean reservoir comprising heavy oil and rock, the method comprising: co-injecting steam and solvent into said reservoir for a time sufficient to mobilize hydrocarbons; injecting an anti-retention agent into said reservoir, said anti-retention agent having higher affinity for said solvent than does water or said rock; producing said mobilized hydrocarbons from said reservoir; and recovering solvent from said produced hydrocarbons, wherein more solvent is recovered than would be recovered without said anti-retention agent injection step.

An improved method of ES-SAGD, said ES-SAGD comprising co-injecting steam and solvent into a reservoir comprising hydrocarbon and rock, producing production fluid comprising hydrocarbon, water and solvent at a production well, recovering solvent from said production fluid and recycling said recovered solvent in said co-injection step; the improvement comprising also injecting an anti-retention agent into said reservoir, wherein said anti-retention agent has higher affinity for said solvent than does water or said rock, and wherein more solvent is recovered with said anti-retention agent injection than would be recovered without said anti-retention agent injection.

The method wherein said recovered solvent is recycled in said co-injection step.

The method wherein said anti-retention agent is stable under reservoir conditions for at least one week and/or said anti-retention agent reduces a surface/interfacial tension between said rock and said solvent.

The method wherein said anti-retention agent is co-injected with a gas, and/or said gas is air, oxygen, hydrogen, nitrogen, methane, carbon dioxide, carbon monoxide, hydrogen sulfide, propane, butane, natural gas, flue gas, or natural gas liquids containing ethane, propane or butane.

The method wherein said solvent includes at least 60% by volume of C5+ hydrocarbon solvents.

The method wherein said production fluid also comprises said anti-retention agent, and wherein said anti-retention agent is recovered from said production fluid.

The method wherein said anti-retention agent is in the form of a foam, colloidal dispersion or gel.

The method wherein said anti-retention agent is a foam formed in situ, or formed at a wellpad before said anti-retention agent injection step, or formed during injection.

The method wherein said foam has a density between 0.000598-0.0770 g/cm3 and a viscosity between 0.0123-0.0216 cP.

The method wherein said anti-retention agent comprises an agent selected from the group consisting of alkyl benzene sulfonates, alkyl aromatic sulfonates, olefin sulfonates, alkyl aryl sulfonates, alkoxy sulfates, alkaline metal carbonates, bicarbonates, hydroxides, sodium carbonate, sodium bicarbonate, sodium hydroxide, potassium carbonate, potassium bicarbonate, potassium hydroxide, magnesium carbonate, calcium carbonate, oil soluble surfactants, sorbitan fatty acid esters, saponified hard oils, saponified hydrogenated fatty acid oils, long chain fatty amines, long chain sulfates, long chain sulfonates, phospholipids, lignins, polyethylene glycol mono-oleates, alkanolamide based surfactants, and combinations thereof.

The method wherein said anti-retention agent is also injected into a thief zone.

The method wherein said anti-retention agent is injected into an injection well that is higher than a production well.

The method wherein anti-retention agent injection is alternated with steam and solvent co-injection.

The method wherein said ES-SAGD uses a well configurations comprising at least one horizontal injection well vertically spaced 4-10 meters above at least one production well.

By "anti-retention agent" herein, we mean an agent that reduces the retention of solvent in the reservoir, thus improving oilfield economics. Foams, colloidal dispersions, gels and the like are exemplified anti-retention agents described herein.

The term "fluid" as used herein refers to both vaporized and liquefied fluid in the sense that it is capable of flowing.

By "rock" herein we mean the solid non-hydrocarbon portion of the reservoir, which can be rock, sand, crystalline minerals, etc.

The term "co-injection" as used herein means the two materials are introduced at the same time, using a single mixed fluid stream or two separate fluid streams that ar injected at the same time.

The phrase "injecting foam" or similar phrases is intended to include injecting a pre-made foam, or injecting foaming agents that will create a foam in situ, or creating a foam as part of the injection process.

The term "solvent" as used herein refers to a fluid that has at least one non-aqueous fluid that is soluble in heavy oil and can serve to reduce the viscosity of heavy oil. Examples of suitable candidates for non-aqueous fluids that may be used include but not limited to C1 to C12 hydrocarbons, and combinations thereof, and more preferably to C2 to C10 hydrocarbons. The preferred hydrocarbons herein include C4-C8 or 60% C5+. Examples of suitable hydrocarbons include but not limited to butane, pentane, hexane, heptane, octane, nonane, decane, undecane, dodecane, tridecane, tetradecane, diluent, kerosene, naphtha, and combinations thereof. Various readily available hydrocarbon fractions, such as condensate, gasoline, light naptha and combinations thereof can also be used.

It is recognized by those of skill in the art that most solvents are not inexpensively available in 100% pure form and that pure solvents are not needed for enhanced oil recovery methods anyway. Therefore, where it is stated herein that a solvent is a C4 solvent (for example) what is meant is that the majority (>50%) of that solvent has four carbons, and that the remainder may comprise solvents within a similar boiling point range.

The term "C5+" hydrocarbons as used herein means that the majority of the hydrocarbons have at least 5 carbons, but 100% purity is not required. C5+ includes mainly C5-C12 hydrocarbons, but more preferably includes mainly C5-C8 or C5-C6. Terms "C4+" and the like have analogous meanings.

As used herein, "bitumen" and "extra heavy oil" are used interchangeably, and refer to crudes having less than 10° API.

As used herein, "heavy oil" refers to crudes having less than 22° API. The term heavy oil thus includes bitumen's, unless it is clear from the context otherwise.

As used herein a "production stream" or "production fluid" or "produced heavy oil" or similar phrase means a crude hydrocarbon that has just been pumped from a reservoir and typically contains mainly heavy oil and/or bitumen and water, and may also contain additives used in recovery such as solvents, anti-retention agents, foaming agents, and the like.

By "steam", we mean a hot water vapor, at least as provided to an injection well, although some steam will of course condense as the steam exits the injection well and encounters cooler materials. It will be understood by those skilled in the art that steam usually contains additional trace elements, gases other than water vapor, and/or other impurities. The temperature of steam can be in the range of about 150° C. to about 350° C. However, as will be appreciated by those skilled in the art, the temperature of the steam is dependent on the operating pressure, which may range from about 100 psi to about 2,000 psi (about 690 kPa to about 13.8 MPa).

By "low quality steam", we mean a combination of liquid water and water vapor provided to the injection well. In some embodiments, such wet steam is 50 wt. %, 60 wt. % or more liquid water.

In the case of either the single or multiple wellbore embodiments of the invention, if fluid communication is not already established, it must be established at some point in time between the producing wellbore and a region of the subterranean formation containing the hydrocarbon fluids affected by the injected fluid, such that heavy oils can be collected from the producing wells.

By "fluid communication" we mean that the mobility of either an injection fluid or hydrocarbon fluids in the subterranean formation, having some effective permeability, is sufficiently high so that such fluids can be produced at the producing wellbore under some predetermined operating pressure. Means for establishing fluid communication between injection and production wells includes any known in the art, including steam circulation, geomechanically altering the reservoir, RF or electrical heating, ISC, solvent injection, hybrid combination processes and the like.

By "providing" wellbores herein, we do not imply contemporaneous drilling. Therefore, either new wells can be drilled or existing wells can be used as is, or retrofitted as needed for the method.

Injection wells can be the same as production wells, or separate wells can be provided for injection purposes. It is common at the start up phase for production wells to also be used for injection.

By "increased hydrocarbon mobility", we mean that the hydrocarbon has decreased viscosity, as compared with a hydrocarbon produced using only steam under substantially similar injection and formation conditions. Thus, ES-SAGD provides increased hydrocarbon mobility as compared with SAGD alone.

Similarly, when we say that the method results in "improved" solvent recovery, we mean that more solvent is recovered from the production fluid using the claimed foam/colloidal dispersion-based solvent capture method than could be recovered without the anti-retention agent injection, for a similar total injection period in the same reservoir at the same conditions.

The use of the word "a" or "an" when used in conjunction with the term "comprising" in the claims or the specification means one or more than one, unless the context dictates otherwise.

The term "about" means the stated value plus or minus the margin of error of measurement or plus or minus 15% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially chanFge the nature of the invention.

The following abbreviations may be used herein:

| ABBREVIATION | TERM |
| --- | --- |
| API | American Petroleum Institute |
| API gravity | To derive the API gravity from the density, the density is first measured using either the hydrometer, detailed in ASTM D1298 or with the oscillating U-tube method detailed in ASTM D4052. Direct measurement is detailed in ASTM D287. |
| Bbl | barrel |
| C5+ hydrocarbon | Hydrocarbon molecule with five or more carbon atoms |
| COGD | Combustion Overhead Gravity Drainage |
| cP | Centipoise |
| CSS | Cyclic Steam Stimulation |
| CSOR | Cumulative SOR |
| cSt | Centistokes. Kinematic viscosity is expressed in centistokes |
| EM | electromagnetic |
| EOR | Enhanced oil recovery |
| ES-SAGD | Expanding solvent-SAGD |
| FA | Foam assisted |
| FA-SAGD | Foam assisted SAGD |
| FHS | Foam Heat Scavenging |
| ISC | In situ combustion |
| OOIP | Original oil In place |
| RF | Radio frequency |
| SAGD | Steam assisted gravity drainage |
| SAGP | Steam and gas push |
| SAP | Solvent assisted process |
| SF | Steam flooding |
| SOR | Steam-to-oil ratio |
| THAI | Toe to heal air injection |
| VAPEX | Vapor extraction |
| WAG | water alternating gas |

DETAILED DESCRIPTION

ES-SAGD type processes have become popular in the recent years and field tests are currently being performed by several companies in the Athabasca Oil Sands. The most suitable solvent(s) will have similar vaporization thermodynamic behavior to that of water. A low concentration of solvent(s) in the vapor phase is injected along with steam and will be condensed with steam at the front of the steam chamber as the steam and solvent come into contact with the bitumen. It is also important that the chosen solvent(s) condenses at similar conditions to that of steam.

While the injected steam transfers heat to the surrounding bitumen and reduces the viscosity of the bitumen, the injected solvent(s) after condensing at the steam chamber front dilutes the surrounding bitumen and reduces the viscosity of the bitumen. Thus, the combination of steam and solvent(s) makes the ES-SAGD process more effective in reducing the viscosity of the bitumen and therefore, improving oil recovery at faster production rates, but typically, the solvent type(s) and concentrations need to be optimized for each field case.

Overall, ES-SAGD process has the potential to improve oil recovery and rates, lower SOR, lower energy requirements and ultimately lower the water requirements of the process. However, there are additional costs associated with the process mainly due to solvent purchase and transportation costs. Solvent retention within the steam chamber and/or solvent losses up to 50% to the thief zones account for one of the largest inefficiencies of an ES-SAGD process. Therefore, a method to minimize solvent retention and/or losses and improve efficiency of the process and thereby improving the economics of the operation is greatly needed, and this disclosure provides such methods.

After steam and solvent(s) injection for a period of time, an anti-retention agent can be injected to recover solvents. In one embodiment, the field is operated by starting with a SAGD process followed by an ES-SAGD process and finally followed by anti-retention agent and/or low quality steam injection. SAGD or preferably ES-SAGD can again follow the anti-retention agent injection. The method can also be used for other enhanced oil recovery methods where solvent retention is an issue.

In another embodiment, the field is operated by initiating an ES-SAGD process followed by an anti-retention agent injection. In yet another embodiment, thief zones can be blocked with the anti-retention agent, and such injection can precede ES-SAGD or occur as the steam chamber grows to reach nearby thief zones. Thus, the timing of anti-retention agent use can vary, and well as the order of SAGD or ES-SAGD steps.

The method differs to that of other foam-colloid- or gel-based methods due to the different goal achieved with the method (i.e. reducing solvent retention), and thus necessarily different mechanism of action. Because of this, the optimal type of agent differs from prior art foaming, colloidal and gelling agents. Thus, different agents will be selected for the process than would otherwise be used.

The selected anti-retention agent should have a higher affinity for the solvents selected for use in the ES-SAGD process than does water and reservoir rock/sand, but preferably less affinity than the hydrocarbons in the reservoir have for the solvent. Thus, the solvent from the ES-SAGD process will tend to partition into the foam/colloidal dispersion, leaving the rock or sand and water. The foam/colloidal dispersion will eventually collapse, and be produced along with the heavy oil in the reservoir, allowing recovery of the ES-SAGD solvent for recycling. The anti-retention agent ingredients themselves can also be recovered and recycled.

A suitable anti-retention agent would also reduce the surface/interfacial tension between the rock and the solvent, thereby aiding to efficiently remove the solvents that are adsorbed onto rock surfaces. It could also be a solvent soluble/solvent stable anti-retention agent so that the left-behind solvents would dissolve into the foam/colloidal dispersion/gel and transport to the producer.

The chosen agent(s) to create the anti-retention agent should be thermally and chemically stable at the typical temperatures at which thermal recovery processes are operated (~150-350° C.), should have low density (for foams) and low viscosity, should be able to withstand the salinity/divalent cations in the particular formation brine, should have low adsorption onto rock/clay surfaces in the particular reservoir, should not react with the particular reservoir rock minerals and cause precipitation or agent degradation, should degrade with time, but not too quickly, should be effective at the particular reservoir brine pH and should be of reasonable cost.

The desired properties of the generated foam are densities in the range of 0.000598-0.0770 g/cm$^3$ and viscosities in the range of 0.0123-0.0216 cP.

The chemical agent(s) used to create anti-retention agents can include, but are not limited to, foam/colloidal dispersion agents such as surfactants, metal carbonates, bicarbonates and hydroxides or any other colloidal foams, aerosols, hydrosols, emulsions or dispersions.

Thermally and chemically stable, non-ionic, anionic, cationic and amphoteric/zwitterionic surfactants including, but not limited to, alkyl benzene (aromatic) sulfonates, alpha or internal olefin sulfonates, alkyl aryl sulfonates and alkoxy sulfates could be used. Alkaline metal carbonates, bicarbonates and hydroxides including, but not limited to sodium carbonate, sodium bicarbonate, sodium hydroxide, potassium carbonate, potassium bicarbonate, potassium hydroxide, magnesium carbonate and calcium carbonate could also be used as a foam/colloidal dispersion agent.

The surfactant and/or alkali concentration should be optimized for the particular rock/oil/brine system. Furthermore, any other colloidal foams, aerosols, hydrosols, emulsions or dispersions that can create a suitable foam could also be used.

Hydrocarbon based or solvent/oil soluble surfactants may be ideal to be used with solvent injection as long as the foams created with these surfactants are low density and low viscosity foams (0.000598-0.0770 g/cm$^3$ and 0.0123-0.0216 cP).

Oil soluble surfactants which could be used to create anti-retention agents include, but are not limited to, sorbitan fatty acid esters, saponified hard oils, saponified hydrogenated fatty acid oils, long chain fatty amines, long chain sulfates, long chain sulfonates, phospholipids, lignins, polyethylene glycol mono-oleates, alkanolamide based surfactants, any other oil soluble surfactants and any combinations thereof.

Solvent losses to the thief zones can be minimized by injecting a suitable chemical that can act as a barrier between the bitumen pay and thief zone and therefore, reduce solvent(s) from entering the thief zones. In one embodiment of this proposed method, a foam/colloidal dispersion could be placed in the thief zone (for example in the top water zone) using a vertical/horizontal/delineation well. A denser foam/colloidal dispersion could be formed to reduce the permeability and act as a barrier between the thief zone and the pay. The selected foam/colloidal dispersion could also be a polymer/cross linked gel or a time delayed nano material/other chemical that would be activated to form a gel type barrier and reduce the permeability of the formation in the chosen area.

In another embodiment, a vertical/horizontal/delineation well could be placed in the thief zone (for example in the top water zone) and the needed chemicals could be injected to create the foam/colloidal dispersion/gel that would form at a certain temperature. As the steam chamber reaches the top of the pay, the top water area would get heated and once the needed temperature is reached, the injected chemical would form a suitable foam/colloidal dispersion/gel that would hinder the solvents from transporting to the top water zone. This process could also be used during a SAGD process to minimize heat losses to a top water/thief zone and improve the thermal efficiency of a ES-SAGD process.

Additional in-situ steam could be generated by injecting a lower quality steam along with one of the above mentioned chemical agents and a gas. Low quality steam is a mixture of steam and hot water that is generated when not all of the water is converted to steam in a surface steam generator.

For the generation of foam and for the foam to be sustained, a gas may be used along with the steam. Foams based on steam alone might collapse once the steam inside the foam is condensed. Gases that can be co-injected with the steam and foaming agent(s) include, but are not limited to air, nitrogen, methane, carbon dioxide, propane, butane, natural gas, and flue gas. Gases may come in the form of a gas/liquid mixture; including natural gas liquids containing propane, butane, and hexane.

The foam/colloidal dispersion could be generated on the surface or sub-surface. Sub-surface methods for generating foam include using a downhole static mixer, foam generation through a perforation in the well, natural mixing in the well, and in-situ foam generation in the reservoir.

The disclosure provides a novel method for producing hydrocarbons from a subterranean formation that has at least one injection well and at least one producing well that can communicate with at least a portion of the formation and with each other. The producing well is used for collecting the hydrocarbons, and the injection well is used for injecting a heated fluid composition comprising steam and a solvent. The method comprises combining ES-SAGD with anti-retention agent injection to reduced solvent retention and ultimate recovery from the production fluid.

Another aspect is a method of producing hydrocarbons from a subterranean reservoir that has at least one injection well and at least one producing well that can communicate with at least a portion of the formation, the producing well being used for collecting the hydrocarbons, and the injection well being used for injecting a heated fluid composition comprising steam and a solvent, the method comprising: a) selecting the at least one solvent; b) making a heated fluid composition from the steam and the solvent; c) injecting the heated fluid composition into the formation; d) heating the hydrocarbons in the formation using the fluid composition to increase mobility and producing the mobilized hydrocarbons; e) injecting a anti-retention agent into the reservoir, wherein said anti-retention agent has greater affinity for said solvent than does water or reservoir minerals; and f) collecting production fluids and recovering said solvent from said production fluids, wherein more solvent is recovered with anti-retention agent injection than would be recovered without said anti-retention agent injection.

By adjusting the concentration and composition of the hydrocarbon solvents and the anti-retention agent, one skilled in the art can optimize the best injection strategies that have better recovery economics and overall oil production. This invention thus provides different injection strategies that can significantly reduce solvent retention and improve oil production by altering the hydrocarbon solvents concentration and composition.

The following are incorporated by reference herein in their entireties for all purposes:

Nasr, T. N., Golbeck, H. and Heck, G.: 2003, Novel expanding solvent-SAGD process "ES-SAGD", Journal of Canadian Petroleum Technology 42(1), 13-16.
Nasr, T. N. and Ayodele, O. R.: 2006, New hybrid steam-solvent processes for the recovery of heavy oil and bitumen, paper SPE 101717 presented at the SPE Abu Dhabi International Petroleum Exhibition and Conference, Abu Dhabi. 5-8 November.
Ian D. Gates, Solvent-aided Steam-Assisted Gravity Drainage in thin oil sand reservoirs, J. Petrol. Sci. Engin. 74(3-4):138-146 (2010).
Ashrafi M., et al., Numerical Simulation Study of Field Scale SAGD and ES-SAGD Processes Investigating the Effect of Relative Permeabilities, Energy and Environment Research 3(1): 93-105 (2013).
U.S. Pat. Nos. 6,230,814, 6,591,908, Nasr & Isaacs, "Process for enhancing hydrocarbon mobility using a steam additive," (2001).
US 2014-0144627, Salazar Hernandez & Nasr, "Hydrocarbon Recovery With Steam And Solvent Stages," (2014).
US-2014-0216739, Brown, et al., "Heat Scavenging Method For Thermal Recovery Processes," (2014).
US-2014-0345855, Wilfing & Stalder, "RADIAL FISHBONE SAGD,") 2014).
US-2014-0345861, Pham & Stalder, "FISHBONE SAGD," (2014).
Ser. No. 14/565,961, Warren, et al., "Oil Recovery With Insulating Composition, filed 10 Dec. 2014.

What is claimed is:

1. A method of producing hydrocarbons from a subterranean formation comprising rock and hydrocarbon that has at least one injection well and at least one producing well in fluid communication with each other, the method comprising:
   co-injecting steam and solvent into said injection well;
   selecting an anti-retention agent having a density between 0.000598-0.0770 g/cm3 and a viscosity between 0.0123-0.0216 cP and a higher affinity for said solvent than does water or said rock;
   injecting said anti-retention agent comprising a foam or a colloidal dispersion or a gel into said injection well,
   producing production fluids comprising hydrocarbon, water and solvent from said production well; and
   recovering solvent from said production fluids, wherein more solvent is recovered than would be recovered without the injecting of said anti-retention agent.

2. The method of claim 1, wherein said anti-retention agent is stable under reservoir conditions for at least one week.

3. The method of claim 1, wherein said solvent includes at least 60% by volume of C5+ hydrocarbon solvents.

4. The method of claim 1, wherein said recovered solvent is recycled in said coinjection step.

5. The method of claim 1, wherein said production fluid also comprises said anti-retention agent, and wherein said anti-retention agent is recovered from said production fluid.

6. The method of claim 1, wherein said anti-retention agent is co-injected with a gas.

7. The method of claim 6, wherein said gas is air, oxygen, hydrogen, nitrogen, methane, carbon dioxide, carbon monoxide, hydrogen sulfide, propane, butane, natural gas, flue gas, or natural gas liquids containing ethane, propane or butane.

8. The method of claim 1, wherein said anti-retention agent comprises an agent selected from the group consisting of alkyl benzene sulfonates, alkyl aromatic sulfonates, olefin sulfonates, alkyl aryl sulfonates, alkoxy sulfates, alkaline metal carbonates, bicarbonates, hydroxides, sodium carbonate, sodium bicarbonate, sodium hydroxide, potassium carbonate, potassium bicarbonate, potassium hydroxide, magnesium carbonate, calcium carbonate, oil soluble surfactants, sorbitan fatty acid esters, saponified hard oils, saponified hydrogenated fatty acid oils, long chain fatty amines, long chain sulfates, long chain sulfonates, phospholipids, lignins, polyethylene glycol mono-oleates, alkanolamide based surfactants, and combinations thereof.

9. A method of producing hydrocarbons from a subterranean reservoir comprising heavy oil and rock, the method comprising: co-injecting steam and solvent into said reservoir for a time sufficient to mobilize hydrocarbons;

selecting an anti-retention agent having a density between 0.000598-0.0770 g/cm3 and a viscosity between 0.0123-0.0216 cP and a higher affinity for said solvent than does water or said rock;

injecting said anti-retention agent into said reservoir;

producing said mobilized hydrocarbons from said reservoir; and recovering solvent from said produced hydrocarbons, wherein more solvent is recovered than would be recovered without the injecting of said anti-retention agent.

10. The method of claim 9, wherein said anti-retention agent reduces a surface/interfacial tension between said rock and said solvent.

11. The method of claim 9, wherein anti-retention agent injection is alternated with steam and solvent co-injection.

12. The method of claim 9, wherein said anti-retention agent is a foam formed in situ.

13. The method of claim 9, wherein said anti-retention agent is a foam formed at a wellpad before said anti-retention agent injection step.

14. The method of claim 9, wherein said anti-retention agent is a foam formed during injection.

15. The method of claim 9, wherein said solvent comprises at least 60% C5+ hydrocarbons.

16. The method of claim 9, further comprising recycling said recovered solvent for further co-injecting with the steam.

17. The method of claim 9, wherein said anti-retention agent is injected into a thief zone.

18. The method of claim 9, wherein said anti-retention agent is injected into an injection well that is higher than a production well.

19. An improved method of ES-SAGD, said ES-SAGD comprising coinjecting steam and solvent into a reservoir comprising hydrocarbon and rock, producing production fluid comprising hydrocarbon, water and solvent at a production well, recovering solvent from said production fluid and recycling said recovered solvent in said co-injection step; the improvement comprising selecting an anti-retention agent with a density between 0.000598-0.0770 g/cm3 and a viscosity between 0.0123-0.0216 cP and a higher affinity for said solvent than does water or said rock and injecting said anti-retention agent into a new well or a delineation well drilled in a thief zone in said reservoir and wherein more solvent is recovered with said anti-retention agent injection than would be recovered without said anti-retention agent injection.

\* \* \* \* \*